United States Patent
Long

(10) Patent No.: US 10,956,038 B2
(45) Date of Patent: Mar. 23, 2021

(54) NON-VOLATILE MEMORY DRIVE PARTITIONS WITHIN MICROCONTROLLERS

(71) Applicant: International Business Machines Corporation, Armonk, NY (US)

(72) Inventor: Thomas C. Long, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 15/827,325

(22) Filed: Nov. 30, 2017

(65) Prior Publication Data

US 2018/0081547 A1    Mar. 22, 2018

Related U.S. Application Data

(63) Continuation of application No. 14/847,153, filed on Sep. 8, 2015, now Pat. No. 9,857,976, which is a continuation of application No. 14/751,282, filed on Jun. 26, 2015, now Pat. No. 9,857,975.

(51) Int. Cl.
*G06F 9/44* (2018.01)
*G06F 3/06* (2006.01)
*G06F 11/07* (2006.01)

(52) U.S. Cl.
CPC .......... *G06F 3/0604* (2013.01); *G06F 3/0644* (2013.01); *G06F 3/0659* (2013.01); *G06F 3/0679* (2013.01); *G06F 11/0766* (2013.01)

(58) Field of Classification Search
CPC .................................................. G06F 3/0604

USPC ........................................................ 717/168
See application file for complete search history.

(56) References Cited

U.S. PATENT DOCUMENTS

| | | | |
|---|---|---|---|
| 4,802,161 | A | 1/1989 | Byars |
| 5,448,558 | A | 9/1995 | Gildea |
| 5,664,223 | A | 9/1997 | Bender |
| 5,765,004 | A | 6/1998 | Foster |
| 5,960,214 | A | 9/1999 | Sharpe, Jr. |
| 6,035,351 | A | 3/2000 | Billings |
| 6,094,600 | A | 7/2000 | Sharpe, Jr. |
| 6,311,237 | B1 | 10/2001 | Suzuki |
| 6,526,467 | B1 | 2/2003 | Joh |

(Continued)

OTHER PUBLICATIONS

Pfeiffer, et al., "Using Flash Memory in Embedded Applications", © Embedded Systems Academy 1999-2015, 5 pages, printed Jun. 19, 2015, <http://www.esacademy.com/en/library/technical-articles-and-documents/8051-programming/using-flash-memory-in-embedded-applications.html>.

(Continued)

*Primary Examiner* — Wei Y Zhen
*Assistant Examiner* — Lanny N Ung
(74) *Attorney, Agent, or Firm* — Daniel R. Simek

(57) ABSTRACT

A method for managing data on a microcontroller. The method includes a computer processor receiving data to write to the memory of a microcontroller of a field-replaceable unit (FRU). The method further includes a computer processor determining that the received data is a type of data that is stored in a first logical partition, wherein the first logical partition is a logical partition of non-volatile memory of the microcontroller. The method further includes a computer processor determining whether the first logical partition includes sufficient space to store the received data.

18 Claims, 6 Drawing Sheets

(56) References Cited

U.S. PATENT DOCUMENTS

| | | |
|---|---|---|
| 6,542,939 B1 | 4/2003 | Osten |
| 6,560,703 B1 | 5/2003 | Goodman |
| 6,587,889 B1 | 7/2003 | Kaminsky |
| 6,792,527 B1 | 9/2004 | Allegrucci |
| 6,892,159 B2 | 5/2005 | Weiss et al. |
| 6,922,702 B1 | 7/2005 | Jensen |
| 6,934,879 B2 | 8/2005 | Misra et al. |
| 6,978,452 B2 | 12/2005 | Oesterreicher et al. |
| 6,996,635 B2 | 2/2006 | Goodman et al. |
| 7,131,030 B2 | 10/2006 | Gilstrap |
| 7,168,007 B2 | 1/2007 | Gilstrap |
| 7,191,282 B2 | 3/2007 | Blin |
| 7,206,970 B1 | 4/2007 | Lauterbach et al. |
| 7,243,347 B2 | 7/2007 | Palmer |
| 7,353,322 B1 | 4/2008 | Brown |
| 7,519,796 B1 | 4/2009 | Golla |
| 7,657,669 B2 | 2/2010 | Kuo |
| 7,889,659 B2 | 2/2011 | Montalvo |
| 7,971,025 B2 | 6/2011 | Murase |
| 8,054,847 B2 | 11/2011 | Albrecht |
| 8,626,973 B2 | 1/2014 | Austen |
| 8,843,937 B2 | 9/2014 | Renault |
| 8,910,017 B2 | 12/2014 | Sharon |
| 2003/0217043 A1 | 11/2003 | Weiss |
| 2003/0217247 A1 | 11/2003 | Abramovitz |
| 2003/0236998 A1 | 12/2003 | Gilstrap |
| 2004/0054883 A1 | 3/2004 | Goodman et al. |
| 2004/0102950 A1 | 5/2004 | Agarwala |
| 2004/0162945 A1 | 8/2004 | King et al. |
| 2004/0215569 A1 | 10/2004 | Agha |
| 2005/0102660 A1* | 5/2005 | Chen ................ G06F 8/65 717/168 |
| 2006/0120289 A1 | 6/2006 | Cunningham |
| 2006/0129613 A1 | 6/2006 | Goodman |
| 2006/0209621 A1 | 9/2006 | Andoh |
| 2006/0212752 A1 | 9/2006 | Mechalke |
| 2007/0233955 A1 | 10/2007 | Luo et al. |
| 2008/0147937 A1 | 6/2008 | Freimuth |
| 2009/0132061 A1 | 5/2009 | Stubbs |
| 2009/0158071 A1 | 6/2009 | Ooi et al. |
| 2009/0307677 A1* | 12/2009 | Long ................ G06F 8/654 717/168 |
| 2010/0228906 A1 | 9/2010 | Ramiya Mothilal et al. |
| 2010/0229575 A1 | 9/2010 | Shaw |
| 2010/0332909 A1 | 12/2010 | Larson |
| 2011/0099556 A1 | 4/2011 | Long et al. |
| 2011/0154097 A1 | 6/2011 | Barlow et al. |
| 2011/0154115 A1 | 6/2011 | Calkin et al. |
| 2011/0235518 A1 | 9/2011 | Halabi |
| 2012/0215941 A1 | 8/2012 | Brownlow |
| 2012/0254658 A1 | 10/2012 | Tatsuno |
| 2012/0317265 A1 | 12/2012 | Das |
| 2013/0083830 A1 | 4/2013 | Locke |
| 2013/0124770 A1 | 5/2013 | Caporale |
| 2013/0208593 A1 | 8/2013 | Nandagopal |
| 2015/0281015 A1 | 10/2015 | Griffith |
| 2016/0098311 A1 | 4/2016 | Boecker |

OTHER PUBLICATIONS

Van Dijk, Luc, "Cost Effective Non Volatile Memory Solution that Circumvents Flash", An IP.com Prior Art Database Technical Disclosure, IP.com No. 000226236, Publication: Mar. 25, 2013, 6 pages.

Van Dijk, Luc, "Central Non Volatile Memory for Data and/or Program Memory Storage", An IP.com Prior Art Database Technical Disclosure, IP.com No. 000226238, Publication: Mar. 25, 2013, 6 pages.

List of IBM Patents or Patent Applications Treated as Related, Appendix P, Filed Herewith.

Long, Thomas C., "Non-Volatile Memory Drive Partitions Within Microcontrollers", U.S. Appl. No. 14/751,282, filed Jun. 26, 2015.

Long, Thomas C., "Non-Volatile Memory Drive Partitions Within Microcontrollers", U.S. Appl. No. 14/847,153, filed Sep. 8, 2015.

\* cited by examiner

NON-VOLATILE MEMORY DRIVE PARTITIONS WITHIN MICROCONTROLLERS

BACKGROUND OF THE INVENTION

The present invention relates to the field of electronic devices that incorporate field-replaceable units (FRUs), and more particularly to data management within a microcontroller of a FRU.

In early computer systems and electronic devices, it was often difficult or even impossible to replace certain hardware components, e.g., the power supply, memory, and I/O controllers, after the computer or electronic device had been manufactured. Electronic hardware components in computer systems and electronic devices sometimes fail after the systems have been put into service. When hardware failures occur, the faulty device must be identified and replaced to minimize downtime. Modern computer systems and electronic devices frequently incorporate field-replaceable units (FRUs), which are components, such as a power supply, memory, and I/O controllers that can be replaced in the field (i.e., at user locations) to minimize downtime.

Most computing environments today include several types of memory for storing and manipulating data. The most common are read-only memory (ROM), random-access memory (RAM), programmable read-only memory (PROM), and erasable programmable read-only memory (EPROM or Flash memory). FRUs can include one or more types of memory to store: firmware, vital product data (VPD), monitoring data, and fault data. FRUs may utilize memory that is a discrete component, such as a serial electrically EPROM (SEEPROM) and/or memory that is part of another device, such as a microcontroller (μC). Firmware is the code that is embedded in a hardware device that runs in the ROM and RAM memory of the hardware device, such as a microcontroller and is stored in non-volatile memory.

A failing FRU can communicate the relevant state (e.g., first error data capture) to a monitoring system or monitoring program via a communication network. Information related to the status of a system and symptoms related to the failure of a hardware component, such as the FRU, are valuable troubleshooting aids for a system manufacturer, a service organization, and the designer of the FRU.

SUMMARY

According to an aspect of the present invention, there is a method, computer program product, and/or system for managing data on a microcontroller. The method includes one or more computer processors receiving data to write to memory of a microcontroller of a field-replaceable unit (FRU). The method further includes one or more processors determining that the received data is a type of data that is stored in a first logical partition, wherein the first logical partition is a logical partition of non-volatile memory of the microcontroller. The method further includes one or more processors determining, by one or more computer processors, whether the first logical partition includes sufficient space to store the received data.

DETAILED DESCRIPTION

Figure 1:
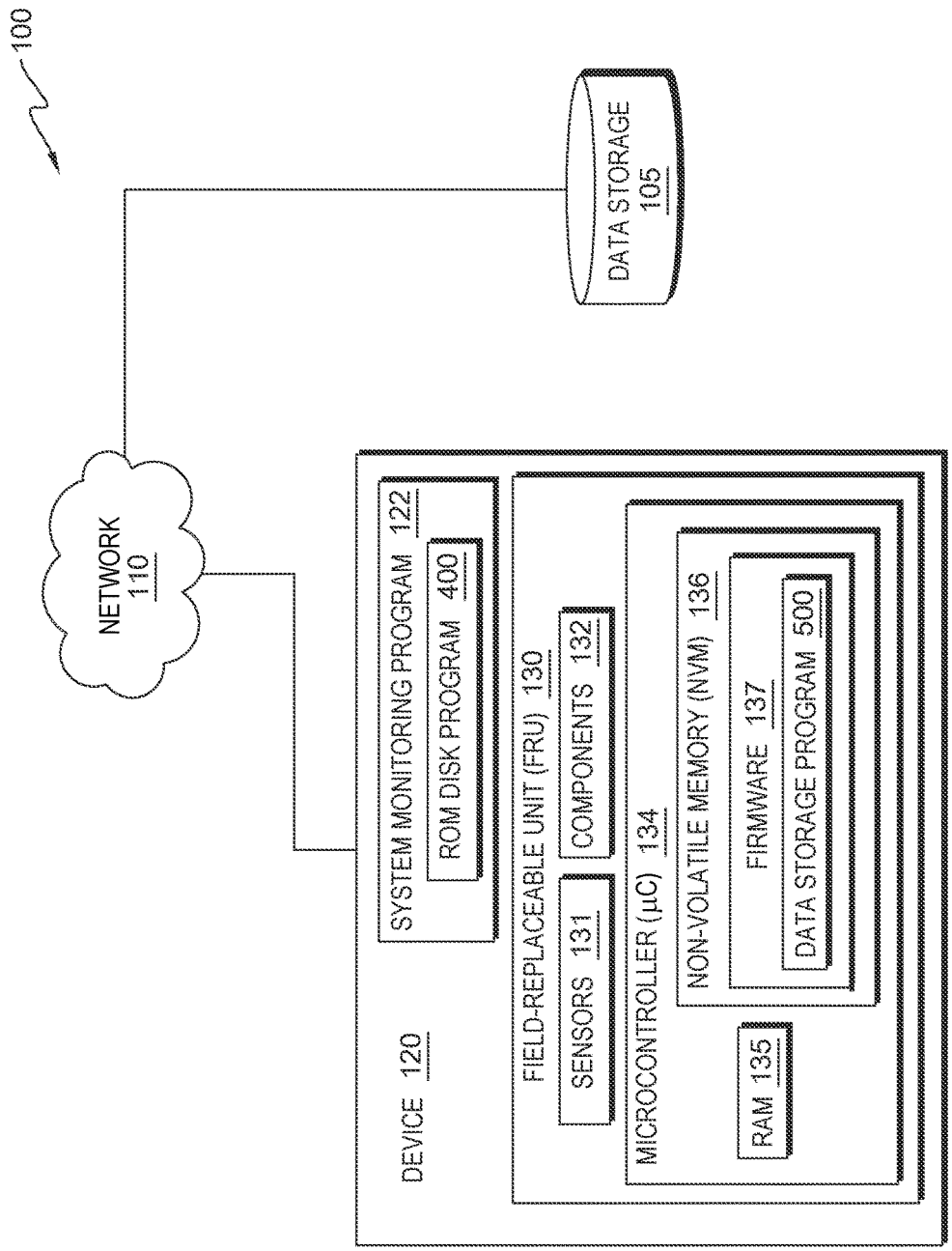
FIG. 1 illustrates a computing environment incorporating a field-replaceable unit (FRU) within a computing device, in accordance with an embodiment of the present invention.

Embodiments of the present invention recognize that if a field-replaceable unit (FRU) fails, capturing the relevant state data may be important to the subsequent failure analysis of the FRU. One function of the firmware within the FRU is to collect and store state data (e.g., runtime data, variable data) in the RAM of the microcontroller (μC). For example, in a power/thermal FRU, state data may include: temperature, voltages, currents, air pressure, humidity, and component/subs-system data. State data may be provided by sensors and components within the FRU as well as relevant state and operational data from the computing system or electronic device utilizing the failed FRU. In another example, a data storage FRU may include self-monitoring, analysis, and reporting technology (SMART), which is a monitoring system included in computer hard disk drives (HDDs) and solid-state drives (SSDs) that detects and reports on various indicators of drive reliability with the intent of enabling the anticipation of hardware failures. Another function of the firmware of the FRU may be to compare the state data to product data or predefined conditions to log anomalous state data that may be a precursor to the failure of the FRU.

Communication of state data among the components of an FRU, between the computing system and FRU, and between FRUs and a hardware monitoring system are accomplished via one or more communication networks. Licensed internal code (LIC) is a system-level computing code (i.e., software) that: manages the communications with the FRUs within a computing device, performs cyclic monitoring, and logs data from each FRU. In some embodiments, the LIC is included in a system monitoring program. An LIC may be specific to a type of FRU (e.g., a power/thermal FRU). In other embodiments, the LIC may execute separately or in conjunction with a service element. Subsequently, the LIC prepares system reference codes (SRC) when a FRU faults/fails. The SRC is subsequently communicated to another device, such as a service element (SE) (not shown) which stores the SRC on a hard-drive or flash memory device for future retrieval or transmission to the supplier of the FRU. In one embodiment, a service element is a PC or a laptop that is utilized to monitor and communicate with one or more FRUs within a computing device. Embodiments of the present invention recognize that the firmware of the FRU may analyze the state data and detect failures prior to an LIC determining that a problem exists. Embodiments of the present invention may capture and store the state data without intervention by the LIC.

Embodiments of the present invention also recognize that each step in the communication chain (e.g., network) represents a potential to lose some or all of the state data associated with the failure of an FRU. In addition, the SRC generated by the LIC may not completely describe the state data or first error data capture (FEDC) data initially obtained by a FRU. Embodiments of the present invention recognize that non-volatile memory within a µC can store FEDC data and anomalous data on the FRU. Embodiments of the present invention may create one or more logical portions (e.g., ROM disks) within the portion of the non-volatile memory (e.g., flash memory) not utilized by the firmware of the FRU. In an embodiment, the code that executes flash erase/write/program operations is stored in ROM as opposed to being downloaded to the RAM from an LIC or system monitoring program 122. In a scenario, the logical drive write function is copied into RAM from the firmware 137 in the ROM (e.g., NVM 136) when FRU 130 initializes. The logical drive write function executes from RAM when the firmware identifies a condition that triggers writing to a logical partition (e.g., calls the logical drive write function). The execution of firmware 137 pauses in ROM. The logical drive write function performs a single write operation to the applicable logical drive partition (e.g., ROM disk). Subsequently, firmware 137 resumes execution in NVM 136 from the point in the firmware that called the logical drive write function. The logical drive write function remains in RAM.

In addition, embodiments of the present invention may monitor the communication between the FRU and other systems (e.g., the LIC) and store current state data to a ROM disk when the network is not available. When network communication is available, the state data saved to a ROM disk is transmitted (e.g., uploaded).

Further embodiments of the present invention also recognize that other data utilized by an FRU, such as VPD and virtual LAN (VLAN) tables, may be stored within a ROM disk partition. VPD data for an FRU may include: a part number, a serial number, an engineering change (EC) level, a firmware version number, calibration data, runtime hours, one or more state data parameters utilized by the firmware, etc. In some embodiments of the present invention, utilizing the ROM disk may eliminate one or more other memory devices within the FRU, such as an SEEPROM. In other embodiments of the present invention, utilizing a ROM disk to store a VLAN table may reduce the time at power-on to initiate the communication among FRUs, the LIC, and the computing device.

In addition, embodiments of the present invention recognize that information written to non-volatile memory, such as NAND flash of the µC, is written sequentially with the next block of data within a logical drive being written immediately after the prior block of data. In order, the overwrite data stored in a given block of memory with new data, that entire block must be completely erased prior to include the new data. Each block can be put through a limited number of erase-cycles before becoming unreliable or the data stored there being corrupted. With NAND flash, for instance, the erase-cycle limit may vary depending on the specific technology incorporated. Such erase-cycle limits may prematurely end the life of a device utilizing NAND flash-based, especially if only small portions of the blocks are repeatedly erased and rewritten. Embodiments of the present invention monitor the size of the data to be stored and available memory space of the ROM disk where the data is to be stored. Memory erasure occurs for the entire ROM disk when the ROM disk is full or insufficient memory space is available.

Embodiments of the present invention also recognize that once logical partitions are created within the non-volatile memory, the size of the logical partitions may only be changed with a firmware update since the firmware itself contains the memory addresses associated with each logical partition.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating computing environment 100 in an embodiment, in accordance with the present invention. An embodiment of computing environment 100 includes device 120 and data storage 105 interconnected over network 110. Many modifications to the depicted environment may be made by those skilled in the art without departing from the scope of the invention as recited by the claims.

Data storage 105 is a persistent data storage location accessible via network 110. Data storage 105 may be included: as part of device 120, as part of a SE within computing environment 100, or on an external computing device that accesses computing environment 100 via network 110. In some embodiment, data storage 105 may include a flash update control program (not shown) utilized to flash new firmware to µC 134. Data storage 105 may also include: ROM disk program 400, various versions of firmware 137 (e.g., different logical partitioning information, firmware for different EC level FRU 130s, firmware for different FRUs, etc.), a library of VPD for one or more instances of FRU 130, VLAN tables, etc. that are downloaded to µC 134. In other embodiments, data storage 105 receives data from FRU 130. In one scenario, data storage 105 receives state data from FRU 130. In another scenario, data storage 105 receives FRU support data from FRU 130 prior to reallocating/resizing one or more ROM disks. For example, if an update to firmware 137 increases the size of firmware 137 above the amount of NVM 136 allocated for firmware 137, one or more logical partitions may be resized and the data in those one or more partitions may be lost if the data is not uploaded to data storage 105.

In an embodiment, data storage 105 is persistent storage that resides within device 120 that is accessed by an internal network or communication fabric. Data storage 105 may include system monitoring program 122, ROM disk program 400, FRU support data, and state data received from FRU 130.

Device 120 may be a laptop computer, a tablet computer, a netbook computer, a personal computer (PC), a desktop computer, a personal digital assistant (PDA), a smart phone, a wearable device (e.g., digital eyeglasses, smart glasses, a smart watch), or any programmable computer system known in the art. In some embodiments, device 120 represents computer systems utilizing clustered computers and components (e.g., database server computers, application server computers, file server computer, network-attached storage devices, etc.) that act as a single pool of seamless resources when accessed through network 110, as is common in data centers and with cloud-computing applications. In general, device 120 is representative of any programmable electronic device or combination of programmable electronic devices capable of executing machine readable program instructions and communicating with data storage 105 via network 110. In various embodiments, device 120 may be any device utilizing one or more FRUs and computing hardware to control device 120. For example, device 120 may be an industrial robot, computerized machinery, transportation devices, remote monitoring stations, etc. Device 120, FRU 130, µC 134, and data storage 105 may include components, as depicted and described in further detail with respect to FIG. 6, in accordance with embodiments of the present invention.

In one embodiment, device 120, FRU 130, µC 134, and data storage 105 communicate through network 110. Network 110 can be, for example, a local area network (LAN), a telecommunications network, a wireless local area network (WLAN), a wide area network (WAN), such as the Internet, or any combination of the previous, and can include wired, wireless, or fiber optic connections. In general, network 110 can be any combination of connections and protocols that will support communications between device 120, FRU 130, µC 134, and data storage 105, in accordance with embodiments of the present invention. In another embodiment, network 110 operates locally via wired, wireless, or optical connections and can be any combination of connections and protocols (e.g., near field communication (NFC), laser, infrared, etc.).

Device 120 includes system monitoring program 122, field-replaceable unit (FRU) 130, a plurality of components (not shown), and various programs (not shown) utilized to operate device 120 (e.g., networking programs, a hypervisor, etc.).

System monitoring program 122 is a program or suite of programs that monitors and controls various aspects of the FRUs utilized by device 120. System monitoring program 122 includes one or more licensed internal code (LIC) programs. A LIC may communicate with microcontroller 134, RAM 135, and non-volatile memory 136 independent of ROM disk program 400 or data storage program 500. In one embodiment, system monitoring program 122 may include one or more LICs and ROM disk program 400. In other embodiments, system monitoring program 122 utilizes the LIC to obtain ROM disk program 400 from a service element or from data storage 105. In some embodiments, system monitoring program 122 may include one or more protocols, such as simple network management protocol (SNMP), which communicates with one or more service elements, one or more administrative computers (not shown), or system administrators (not shown).

ROM disk program 400 creates one or more additional logical partitions within NVM 136. ROM disk program 400 may save FRU support data from NVM 136 to RAM 135 or data storage 105 prior to creating one or more logical partitions within NVM 136. In addition, ROM disk program 400 may upload data within one or more logical partitions prior to flashing (e.g., writing) updated firmware that defines (e.g., creates, eliminates, resizes) one or more logical partitions. In some embodiments, ROM disk program 400 may be utilized during the manufacture of FRU 130 to create the initial logical partitions. ROM disk program 400 may write a version of firmware 137 to a partition within NVM 136 that includes the memory addresses for one or more other logical partitions. In other embodiments, ROM disk program 400 may also write FRU support data to one or more partitions. FRU support data may include VPD information and VLAN tables.

In other embodiments, ROM disk program 400 can update FRU 130 while in operation (e.g., in the field) within device 120. In a scenario, ROM disk program 400 applies updated firmware 137 to µC 134 to create one or more logical partitions within NVM 136. In another scenario, ROM disk program 400 applies modified firmware 137 to resize one or more logical partitions within NVM 136 of µC 134.

FRU 130 is representative of one or more field-replaceable units within device 120. FRU 130 may be a power/thermal device, an I/O controller, a DASD unit, a networking hub, a graphical interface, etc. FRU 130 includes sensors 131, components 132, and microcontroller (µC) 134. Sensors 131 and components 132 provide µC 134 state information during the operation of FRU 130. µC 134 may interface with components 132 to control some of the operations of FRU 130. For example, in a power/thermal FRU, components 132 may regulate the voltage and current supplied to device 120.

µC 134 may be a general purpose microcontroller (e.g., an off-the-shelf microcontroller, an electronic component). µC 134 includes RAM 135, non-volatile memory (NVM) 136, firmware 137, and data storage program 500. NVM 136 may be NAND flash memory. NVM 136 stores firmware 137 which includes data storage program 500. µC 134 may also include (not shown): ROM (e.g., EPROM), a memory address decoder, a peripheral bridge, a system control unit, timers, I/O ports, and a microprocessor. In some embodiments, µC 134 includes one or more software routines supplied by the manufacturer of µC 134. One example of a software routine supplied the manufacturer of µC 134 is a RAM flash update control program. In another example, a manufacturer of µC 134 includes a flash memory programming function that may write and/or erase flash NVM. In one scenario, the one or more software routines supplied by the manufacturer of µC 134 are included on the EPROM. In another scenario, the one or more software routines supplied by the manufacturer of µC 134 are included within masked-defined ROM. In other scenarios, the one or more software routines supplied by the manufacturer of µC 134 are provided to the manufacturer of FRU 130 as code that is included in firmware 137.

RAM 135 is volatile memory that receives and stores state data (e.g., variable data) from FRU 130. In addition, RAM 135 may store temporary variables utilized by firmware 137. RAM 135 may also store one or more firmware functions for execution when firmware 137 is paused. In some embodiments, RAM 135 may be larger than firmware 137 and a portion of NVM 136 utilized for ROM disks. In instances when RAM 135 is larger than firmware 137, firmware 137 may be stored in RAM 135 prior to a flash write. In other embodiments, RAM 135 may be have less storage capacity than firmware 137. In instances when RAM 135 is smaller than firmware 137, a RAM flash update control program may be utilized to write firmware 137 and other FRU support information as blocks to NVM 136.

Firmware 137 may include one or more software routines supplied by the manufacturer of µC 134 (e.g., a flash memory write function, a flash memory programming function, a flash memory erase function), the control code for FRU 130, code that analyzes the received state data, and the code that defines the size and memory locations associated with the one or more ROM disks created within NVM 136. Firmware 137 also includes data storage program 500. Firmware 137 may utilize one or more state data parameters stored within a VPD file to analyze state data received to RAM 135. Firmware 137 may utilize the one or more state data parameters (e.g., state values, state tolerances, statistics utilized by state analysis) from the VPD data to determine whether the received state data indicates data indicating normal operations of FRU 130, anomalous (e.g., atypical) activity or values of FRU 130, or FEDC information for FRU 130.

In a further embodiment, if the failure of FRU 130 affects firmware 137, then upon failure analysis of FRU 130, a "working" copy of firmware 137 may be flashed to NVM 136. The working copy of firmware 137 may enable access to some or all of the FEDC data stored in a ROM disk (e.g., logical partition) within NVM 136. In one scenario, the "working" copy of firmware 137 is an identical copy (e.g., version) of firmware 137 that was on FRU 130 when FRU 130 failed. In another scenario, the "working" copy of firmware 137 is a simplified version of firmware 137 that includes the logical partition information (e.g., memory addresses) and sufficient functionality to read the data stored in one or more ROM disks (e.g., logical partitions).

Data storage program 500 determines the memory addresses and size for available storage locations within NVM 136. Data storage program 500 also utilizes firmware 137 to determine the size and nature of data received to RAM 135 to determine whether the received data is stored in a ROM disk. In an embodiment, data storage program 500 may determine that the size of the data received to RAM 135 is larger than the available ROM disk space. Data storage program 500 erases the data stored in a ROM disk and subsequently saves the data received to RAM 135 to the erased ROM disk. In some embodiments, data storage program 500 may determine whether network communication is available to communicate (e.g., upload, transmit) state data to system monitoring program 122 (e.g., a LIC). If network communications is not available, then data storage program 500 stores the state data to a ROM disk.

Figure 2:
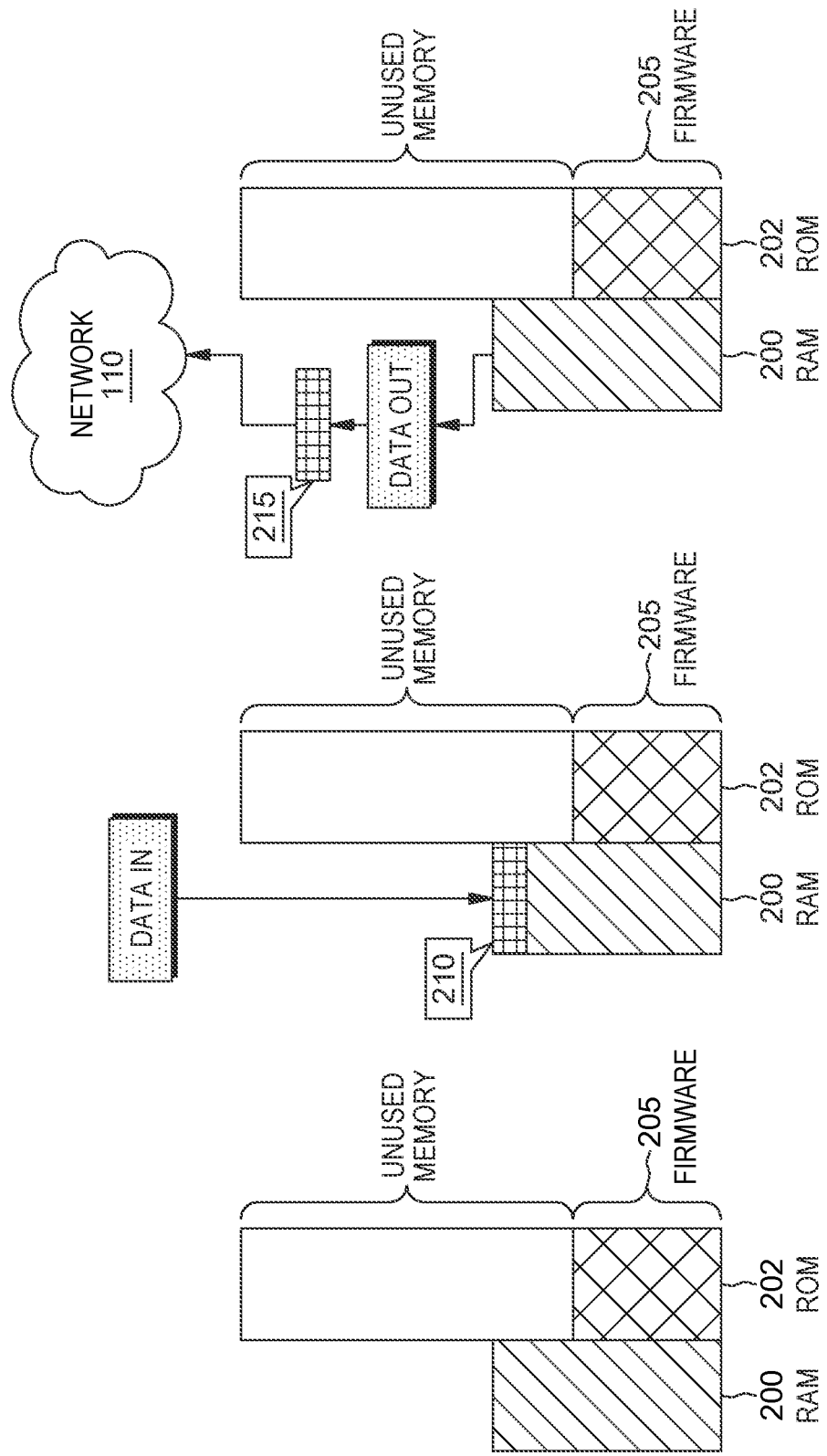
FIG. 2a depicts an illustrative example of volatile memory, non-volatile memory, and firmware within a microcontroller incorporated with a FRU, in accordance with an embodiment of the present invention.
FIG. 2b depicts an illustrative example of data being received into volatile memory within a microcontroller incorporated with a FRU, in accordance with an embodiment of the present invention.
FIG. 2c depicts an illustrative example of data being transferred from volatile memory within a microcontroller to a communication network, in accordance with an embodiment of the present invention.

FIG. 2a is an illustrative example of volatile memory, non-volatile memory, and firmware within a microcontroller incorporated in a FRU prior to implementing embodiments of the present invention. In this illustrative example, RAM 200, ROM 202, and firmware 205 respectively represent RAM 135, NVM 136, and a version of firmware 137 of FRU 130.

In this illustrative example, RAM 200 provides less memory storage than ROM 202. RAM 200 provides sufficient storage to contain firmware 205. ROM 202 stores firmware 205 and includes unused memory (non-shaded area) that is not utilized.

FIG. 2b is an illustrative example of data being communicated (e.g., received) into the volatile memory of the microcontroller discussed in FIG. 2a.

Callout 210 is state data received (i.e., Data IN) from sensors 131 and components 132 of FRU 130. The Data IN may be: data indicating normal operations, data indicating anomalous (e.g., atypical) activity or values, or FEDC information.

FIG. 2c is an illustrative example of data being communicated (e.g., transferred) from volatile memory within a microcontroller to a communication network after being analyzed by the firmware stored on non-volatile memory. In some embodiments, data communication may be controlled by system monitoring program 122. In other embodiments, data communication may be initiated by μC 134.

In one embodiment, data OUT may represent an unaltered version of the state data associated with callout 210 of FIG. 2b. In another embodiment, data OUT may be a version of the state data of callout 210 after analysis by firmware 205.

In some embodiments, callout 215 represents data OUT that includes routing information utilized by network 110 to determine a location in which to communicate data OUT. In one example, data OUT (e.g., variable data state data) represents data within normal operating parameters. Callout 215 may be routed to data storage 105 by network 110. In another example, data OUT is FEDC information, and callout 215 identifies the information as such. Network 110 routes the FEDC information to a LIC of system monitoring program 122. However, if network 110 fails prior to communicating the state/FEDC information to system monitoring program 122, then any data resident in RAM 200 can be lost when power is removed from FRU 130.

Figure 3:
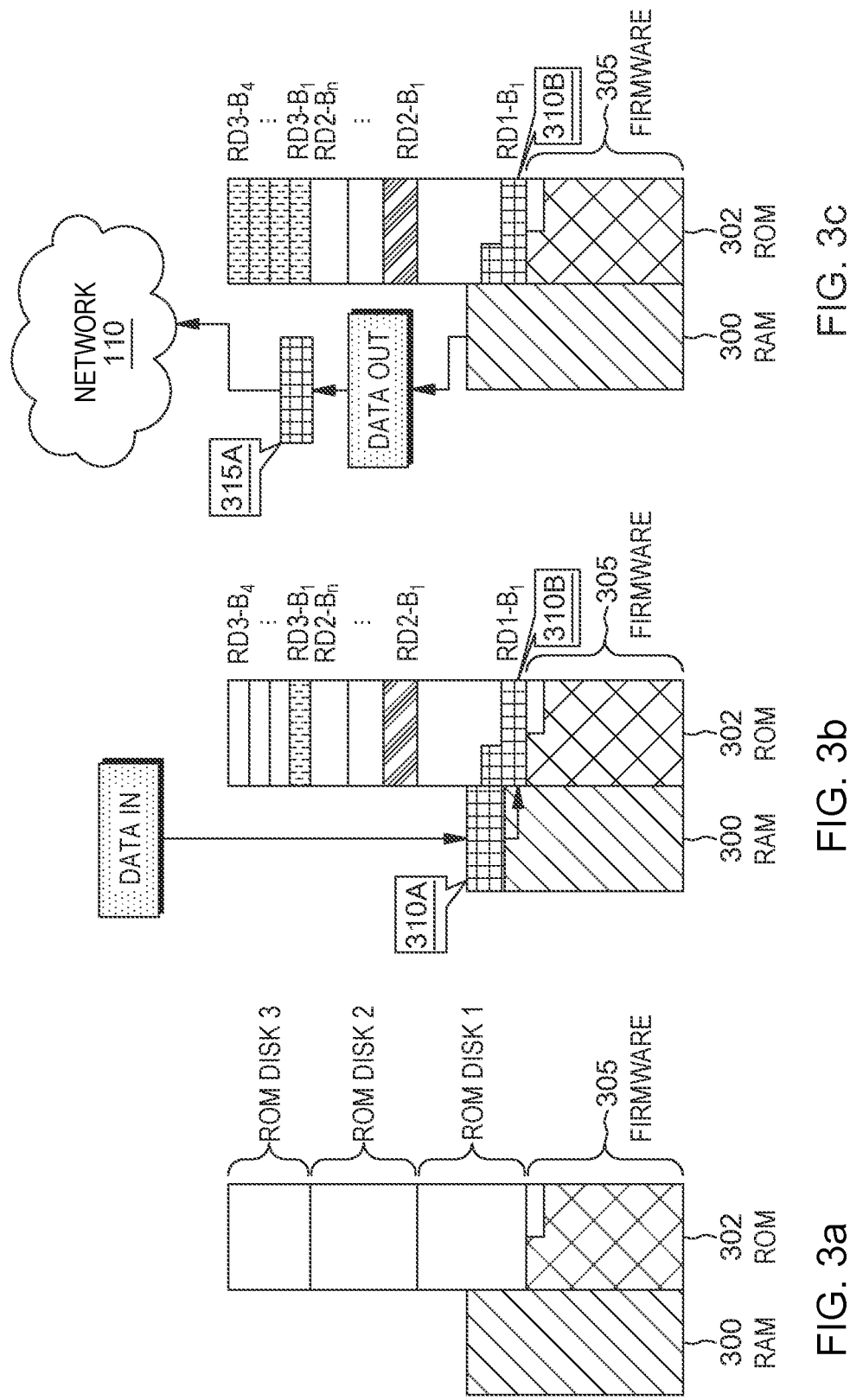
FIG. 3a depicts an illustrative example of creating logical partitions within the unused non-volatile memory within a microcontroller, in accordance with an embodiment of the present invention.
FIG. 3b depicts an illustrative example of data being received into volatile memory and being stored within the non-volatile memory within a microcontroller, in accordance with an embodiment of the present invention.
FIG. 3c depicts an illustrative example of data being transferred from volatile memory within a microcontroller to a communication network, in accordance with an embodiment of the present invention.

FIG. 3a is an illustrative example of volatile memory, non-volatile memory, firmware, and three logical partitions (e.g., ROM disk 1, ROM disk 2, and ROM disk 3) within a microcontroller incorporated in a FRU, implementing embodiments of the present invention. In this illustrative example, RAM 300, ROM 302, and firmware 305 respectively represent RAM 135, NVM 136, and another version of firmware 137 of FRU 130.

NVM 136 within ROM 302 that does not contain software code or information is designated by non-shaded areas. ROM 302, ROM disk 1, ROM disk 2, and ROM disk 3 do not include data. The portion of ROM 302 allocated to firmware 305 includes some unused memory space. Firmware 305 can increase in size until the allocated memory is utilized. The memory addresses utilized by ROM disk 1, ROM disk 2, and ROM disk 3 are defined within firmware 305.

FIG. 3b is an illustrative example of data being communicated (e.g., received) into the volatile memory of the microcontroller discussed in FIG. 3a. In some embodiments, a ROM disk (e.g., ROM disk 2 and ROM disk 3) utilizes a fixed block size to store data. The block size can be a multiple of the memory configuration (e.g., memory addresses) associated with the NVM comprising ROM 302. In on example, if the NVM is comprised of 4K clusters (e.g., ROM disk 2), then the block size within a 12K ROM disk may be 4K (e.g., $RD2\text{-}B_1$ thru $RD2\text{-}B_n$). In another example, if the NVM is organized on 1K clusters (e.g., memory address organization), then the block size within an 8K ROM disk (e.g., ROM disk 3) may be 1K, 2K (e.g., $RD3\text{-}B_1$ thru $RD3\text{-}B_4$), 4K, and 8K.

In other embodiments, a ROM disk (e.g., ROM disk 1) is configured to utilize contiguous memory (e.g., no defined blocks) so that the data stored may utilize variable amounts of NVM (e.g., callout 310B).

In one embodiment, data IN is FRU 130 support data. In one scenario, data IN is VPD. In one example, the initial VPD data for FRU 130 is stored in ROM disk 3, block one (i.e., $RD3\text{-}B_1$). In another scenario, data IN is a VLAN table. In one example, a VLAN table is configured for FRU 130 and stored in ROM disk 2, block one (i.e., $RD2\text{-}B_1$). In another embodiment, data IN is FEDC information for a failed FRU (e.g., FRU 130). In an example, FEDC information for a failed FRU (e.g., FRU 130) is stored in ROM disk 1, block one (i.e., $RD1\text{-}B_1$). In another embodiment, data IN is state data. In one scenario, data IN may be anomalous data obtained prior to FRU 130 failing. In another scenario, data IN may be data from normal operations of FRU 130.

In some embodiments, callout 310A represents state data (i.e., data IN) from sensors 131 and components 132 of FRU 130 that is received into RAM 300 for analysis by firmware 305. Data IN may be: data indicating normal operations, data indicating anomalous (e.g., atypical) activity or values, or FEDC information.

Callout 310B represents the analyzed version of callout 310A (e.g., data IN) that is stored in ROM disk 1 (e.g., RD1-$B_1$). In one embodiment, callout 310B represents FEDC information for FRU 130. In another embodiment, callout 310B represents anomalous state data from FRU 130.

FIG. 3c is an illustrative example of data being communicated (e.g., transferred) from volatile memory within a microcontroller to a communication network after being analyzed by the firmware stored on non-volatile memory.

In one embodiment, callout 315A represents data OUT that includes routing information utilized by network 110 to determine a location to communicate the data OUT. In another embodiment, callout 315A represents callout 310B that includes routing information utilized by network 110 to determine a location to communicate the analyzed data OUT. In some embodiments, an LIC within system monitoring program 122 determines a location to communicate the data represented by callout 315A. In one example, data OUT (e.g., variable data, state data) represents data within normal operating parameters. Callout 315A may be routed to data storage 105 by network 110. In another example, data OUT is FEDC information that callout 315A identifies the information as such, and network 110 routes the FEDC information to a LIC of system monitoring program 122. If network 110 fails prior to communicating the state/FEDC information to system monitoring program 122, then the FEDC information represented by callout 310B may be retrieved from FRU 130 during a failure analysis of FRU 130.

In some embodiments of the present invention, firmware 305 may detect that network 110 is off-line. In one example, firmware 305 utilizes a VLAN table stored in ROM disk 2 (e.g., RD2-$B_1$) to determine a location to communicate the data of callout 315A. Prior to data IN being deleted from RAM 300, firmware 305 (e.g., firmware 137) may determine that the location dictated by the VLAN table is not accessible, then firmware 305 saves the normal state data to ROM disk 1 as callout 310B. In other embodiments of the present invention, system monitoring program 122 may detect that network 110 is off-line. Prior to data IN being deleted from RAM 300, system monitoring program 122 may communicate to firmware 305 (e.g., firmware 137) to save the normal state data to ROM disk 1 as callout 310B.

Figure 4:
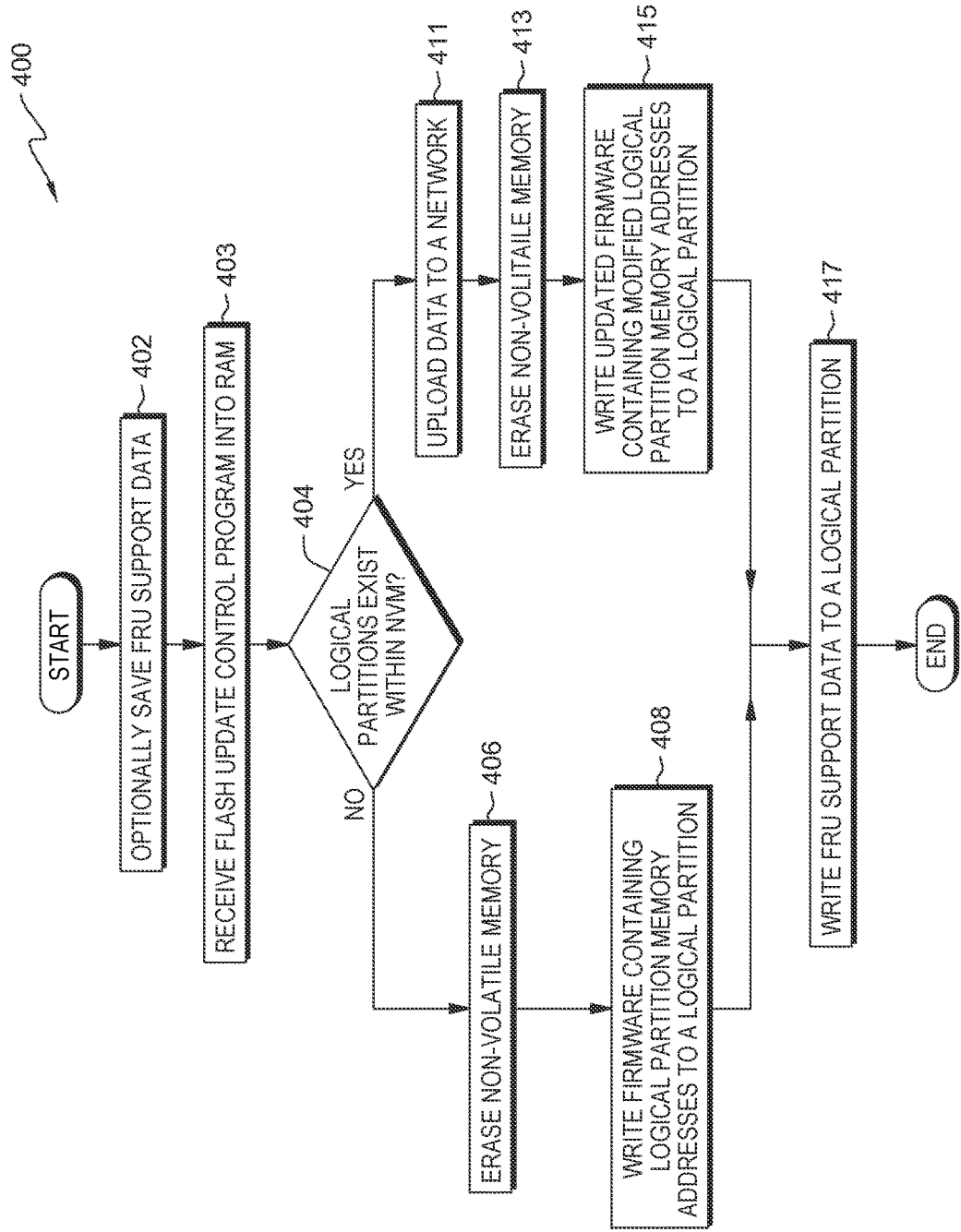
FIG. 4 depicts a flowchart of the operational steps of a ROM disk program, in accordance with an embodiment of the present invention.

FIG. 4 is a flowchart depicting operational steps for ROM disk program 400, a program for defining two or more logical partitions within the non-volatile memory of an FRU, in accordance with embodiments of the present invention.

In step 402, ROM disk program 400 optionally saves the FRU support data. In one embodiment, the FRU is new; therefore, ROM disk program 400 may not need to save FRU support since some or all of the FRU support data has not been incorporated. In one example, the FRU is tested after the FRU is manufactured generating VPD (e.g., FRU support data). In another example, some of the FRU support data (e.g., VPD calibration data, a VLAN table) is not available until FRU 130 is customized for device 120.

In another embodiment, ROM disk program 400 saves the FRU support data prior to updating and/or creating one or more logical drives on FRU 130. In one scenario, ROM disk program 400 may save the FRU support data to RAM 135. In another scenario, ROM disk program 400 may save the FRU support data to data storage 105. In an example, ROM disk program 400 is utilized as part of an update to firmware 137. In this example, the firmware update requires more NVM than is allocated to the logical partition utilized by the current version of firmware 137. ROM disk program 400 stores the FRU support data to data storage 105 enabling the memory addresses pointers for the logical partitions to be adjusted via the firmware update. In another example, ROM disk program 400 copies some or all of firmware 137 into RAM 135 to support operations of FRU 130 while updated firmware is written to NVM 136 (step 415).

In step 403, ROM disk program 400 receives a flash update control program into RAM 135. In one embodiment, ROM disk program 400 copies a flash update control program from firmware 137 into RAM 135. In another embodiment, ROM disk program 400 receives a flash update control program from a source outside of µC 134. In one scenario, ROM disk program 400 downloads a flash update control program to RAM 135 from data storage 105. In another scenario, ROM disk program 400 downloads a flash update control program to RAM 135, system monitoring program 122. In some scenarios, ROM disk program 400 copies a flash update control program to RAM 135 from another device (e.g., a service element) via network 110.

In decision step 404, ROM disk program 400 determines whether two or more logical partitions exist within NVM 136. In one embodiment, ROM disk program 400 determines that FRU 130 does not include two or more logical partitions within NVM 136. For example, ROM disk program 400 determines that a single logical partition exists within NVM 136 that stores firmware 137. In one scenario, FRU 130 is "new", and ROM disk program 400 is utilized to create two or more initial partitions within NVM 136 prior to writing firmware 137. In another scenario, ROM disk program 400 determines that the version of firmware 137 stored in NVM 136 does not support logical partitions. In an example, ROM disk program 400 determines that firmware 137 on FRU 130 is a back-level version of firmware as opposed to the version of firmware 137 stored in data storage 105. In another embodiment, ROM disk program 400 determines that two or more logical partitions are allocated (e.g., exist) within NVM 136. In an example, ROM disk program 400 determines that firmware 137 on µC 134 supports two logical partitions as opposed to a field upgrade for firmware 137 (e.g., a new EC level) that supports three logical partitions.

In decision step 404, responsive to determining that two or more initial logical partitions do not exist within NVM 136 (no branch, decision step 404), ROM disk program 400 erases the NVM 136 of µC 134 (step 406).

In step 406, ROM disk program 400 erases the non-volatile memory of the microcontroller. ROM disk program 400 utilizes the flash update control program in RAM 135 to erase NVM 136.

In step 408, ROM disk program 400 writes firmware 137 containing the logical partition memory addresses to a logical partition. In some embodiments, firmware 137 is stored in the first logical partition with code beginning at memory address 0.

Referring to decision step 404, responsive to determining that two or more logical partitions exists within the NVM (yes branch, decision step 404), ROM disk program 400 uploads data to a network (step 411).

In step 411, ROM disk program 400 uploads data to a network. ROM disk program 400 may read each logical partition and may upload the data within a logical partition to a network. In some embodiments, ROM disk program 400 uploads FRU support data that may not have been saved at step 402. In other embodiments, ROM disk program 400 uploads state data that was previously saved (e.g., flagged) to a ROM disk.

In step 413, ROM disk program 400 erases the non-volatile memory of the microcontroller. ROM disk program 400 utilizes the flash update control program in RAM 135 to erase NVM 136.

In step 415, ROM disk program 400 writes updated firmware 137 containing the modified logical partition memory addresses to a logical partition. In some embodiments, firmware 137 is stored in the first logical partition with code beginning at memory address 0. Referring to FIG. 3b, in one embodiment, an update to firmware 305 (e.g., firmware 137) increases the storage space associated with firmware 305 beyond the current memory address for the start of ROM disk 1. The new version of firmware 305 may utilize the same memory addresses for ROM disk 2 and ROM disk 3. However, the memory allocated to ROM disk 1 is reduced to permit the increased size of firmware 305. The new version of firmware 305 includes the updates to firmware 305 and the modifications to the memory addresses that define the logical partitions.

In step 417, ROM disk program 400 writes FRU support data to a logical partition. In one embodiment, ROM disk program 400 writes the FRU support data saved at step 402 to a logical partition dictated by firmware 137 and/or system monitoring program 122. In one scenario, ROM disk program 400 writes all of the saved FRU support information (e.g., VPD, a VLAN table, etc.) to respective logical partitions. In another scenario, ROM disk program 400 writes a subset of the FRU support data (e.g., the most recent VPD) saved at step 402 to a respective logical partition. In another embodiment, ROM disk program 400 writes updated FRU support data to a logical partition. For example, a service element (SE) may analyze the saved VPD and recent state data from FRU 130 and determine new calibration values that are included in the new VPD. ROM disk program 400 receives the new VPD from the service element via network 110 and system monitoring program 122. ROM disk program 400 subsequently writes the new VPD to the logical partition dictated by firmware 137.

Figure 5:
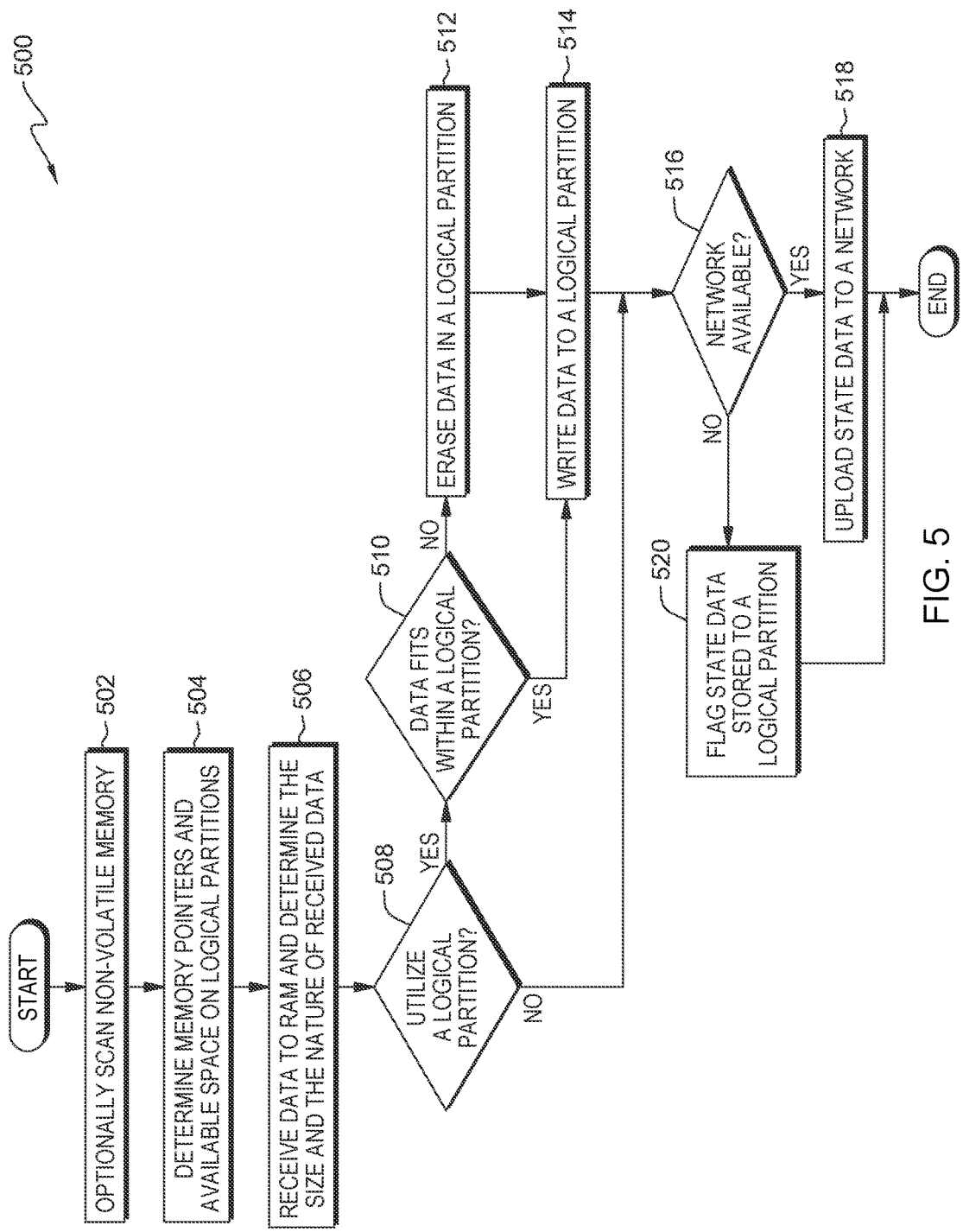
FIG. 5 depicts a flowchart of the operational steps of a data storage program, in accordance with an embodiment of the present invention

FIG. 5 is a flowchart depicting operational steps for data storage program 500, a program for storing data to logical partitions within the non-volatile memory of an FRU, in accordance with embodiments of the present invention.

In step 502, data storage program 500 optionally scans the non-volatile memory of µC 134. In one embodiment, data storage program 500 activates in response to FRU 130 activating. Data storage program 500 may scan NVM 126 to load FRU support data. For example, when FRU 130 activates, data storage program 500 can load the VPD stored in ROM disk 3 and the VLAN table stored in ROM disk 2 (referring to FIG. 3b) from NVM as opposed to loading from a SEEPROM or downloading via network 110. In another embodiment, data storage program 500 scans NVM 136 to determine whether a ROM disk contains a flag indicating that one or more sets of state data (e.g., state data) stored in NVM 136 were not uploaded (e.g., transmitted).

In step 504, data storage program 500 determines memory pointers and available space on logical partitions. In one embodiment, data storage program 500 determines the memory addresses obtained for the next available memory storage space available on each logical partition within NVM 136 and stores the memory addresses as pointers in RAM 135. In addition, data storage program 500 determines the available storage space remaining for each logical partition. In another embodiment, data storage program 500 communicates the available storage space remaining to system monitoring program 122. In one example, system monitoring program 122 may utilize the remaining storage space data communicated by data storage program 500 to determine if a firmware update containing modified logical partition/memory address information is needed in the future. In another example, system monitoring program 122 may utilize the remaining storage space data to determine whether to upload FRU support data (e.g., historical data) to data storage 105 prior to the erasure of a logical partition (in step 512).

In step 506, data storage program 500 receives data into RAM 135 and determines the size and the nature of the received data. Data storage program 500 utilizes various functions within firmware 137 and information (e.g., state parameters) within a VPD to determine (e.g., analyze) the nature of the data (e.g., normal, anomalous, FEDC) that is received to RAM 135. In some embodiments, data storage program 500 includes an indication with the analyzed state data identifying the nature of the state data. In addition, data storage program 500 determines the size of the received data. In one embodiment, data storage program 500 determines that the data received into RAM 135 is state data. Data storage program 500 and firmware 137 determine whether the state data is from normal operations of FRU 130, from anomalous data detected by FRU 130, or from FEDC for a failed or failing FRU 130. In one scenario, data storage program 500 determines that the data received to RAM 135 is FEDC information and determines that the FEDC information is stored to a ROM disk (e.g., ROM disk 1). In another scenario, data storage program 500 determines that the data received to RAM 135 is anomalous data. In addition, data storage program 500 may also determine whether network 110 is available. If network 110 is not available, data storage program 500 may store the anomalous data to a logical partition. In some scenarios, data storage program 500 may store data to a logical partition if network 110 is not available.

In another embodiment, data storage program 500 determines that the data received to RAM 135 is not state data. In one scenario, data storage program 500 determines that the data received to RAM 135 is FRU support data. In one instance, the FRU support data is VPD information communicated by an LIC via network 110. In another instance, the data received to RAM 135 is a VLAN table. In another scenario, data storage program 500 determines that a new version of firmware 137 is available. In one instance, the new version of firmware 137 and a flash update control program are received to RAM 135 via network 110 from a LIC or a SE. In another instance, the new version of firmware 137 does not fit into the storage available in RAM 135. Data storage program 500 determines that a flash update control program is received to RAM 135 prior to flashing the new version of firmware 137 to NVM 136. In some embodiments, data storage program 500 receives information from system monitoring program 122 prior to receiving data to RAM 135 that is associated with the new version of firmware 137. In one example, the data received into RAM 135 dictates the memory addresses utilized by a flash update control program. In another example, data storage program 500 determines that the data received into RAM 135 is block information data. The new version of firmware 137 is received into RAM 135 in blocks (e.g., segments), as opposed to a single file, prior to writing the block to NVM 136.

In decision step 508, data storage program 500 determines whether to utilize a logical partition. In one embodiment, data storage program 500 utilizes a logical partition to store state data. In one scenario, data storage program 500 stores FEDC information to a logical partition. In another scenario, data storage program 500 may store the analyzed state data to a logical partition when network 110 is not available. In another embodiment, data storage program 500 stores FRU support data to a logical partition. In an example, a LIC program within system monitoring program 122 analyzes historic state data for FRU 130 and determines new calibration values for the VPD for FRU 130. Subsequently, data storage program 500 determines that the VPD containing the new calibration values for FRU 130 is stored in a ROM disk. Referring to FIG. 3b, data IN may be VPD for FRU 130 and is received to RAM 300 as callout 310A. However, as VPD information, data storage program 500 stores the received data to ROM disk 3 (e.g., in block RD3-$B_1$).

In one embodiment, responsive to determining to store the FRU support data received to RAM 135, utilizes a logical partition (yes branch, decision step 508), data storage program 500 determines whether the FRU support data received to RAM 135 fits within the available space within a logical partition (decision step 510). In another embodiment, responsive to determining that analyzed state data is stored in a logical partition (yes branch, decision step 508), data storage program 500 determines whether the data received to RAM 135 fits within the available space within a logical partition (decision step 510).

In decision step 510, data storage program 500 determines whether the data in RAM 135 fits within the available space within a logical partition. In one embodiment, data storage program 500 determines whether data received to RAM 135 fits the available storage space by comparing the size of the received data (step 506) to the space available on a logical partition (step 504) associated with the type of data (e.g., VPD, FEDC information, state data, VLAN tables, etc.). In an example (referring to FIG. 3c), ROM disk 3 stores VPD information for FRU 130. Data storage program 500 determines that ROM disk 3 has no available storage; memory blocks RD3-$B_1$ thru RD3-$B_4$ of ROM disk 3 contain information.

In decision step 510, responsive to a decision that the data received to RAM 135 does not fit in the available storage space of a logical partition (no branch, decision step 510), then data storage program 500 erases the data in a logical partition (step 512).

In step 512, data storage program 500 erases the data in a logical partition. In one embodiment, data storage program 500 utilizes a flash erase function included in firmware 137 to erase a logical partition. In another embodiment, data storage program 500 determines that the received data is a firmware update that does not fit within the first logical partition. Data storage program 500 transfers control to ROM disk program 400.

In a different embodiment, data storage program 500 may determine that flagged data stored in a ROM disk is erased. For example, system monitoring program 122 communicates that previously flagged data was received and may be erased. In some instances, data storage program 500 erases a ROM disk to erase flagged data.

Referring to decision step 510, responsive to determining that the data received to RAM 135 fits in a logical partition (yes branch, decision step 510), data storage program 500 writes the received data to a logical partition (step 514).

In step 514, data storage program 500 writes data to a logical partition. Data storage program 500 determines which logical partition stores the received data. In addition, data storage program 500 utilizes the memory pointers determined in step 504 to identify a location to store the received data within a logical partition (e.g., a ROM disk). In one embodiment, data storage program 500 utilizes a flash write function within firmware 137 to write the received data to a logical drive. In another embodiment, data storage program 500 utilizes a flash update control program to write the received data (e.g., new firmware) to a logical drive.

Referring to decision step 508, responsive to determining that the state data received to RAM 135 is not stored in a logical partition (no branch, decision step 508), data storage program 500 determines whether a network is available (decision step 516).

Referring to decision step 516, data storage program 500 determines whether a network is available. In one embodiment, data storage program 500 utilizes network 110 to communicate. In one scenario, data storage program 500 utilizes network 110 to communicate with data storage 105. In one scenario, data storage program 500 utilizes network 110 to communicate with system monitoring program 122. In another embodiment, data storage program 500 utilizes a network or communication fabric internal to device 120 to communicate with system monitoring program 122 or data storage 105.

In decision step 516, responsive to determining that a network is available (yes branch, decision step 516), data storage program 500 uploads the state data via the available network (step 518).

In step 518, data storage program 500 uploads the data to a network. In one embodiment, data storage program 500 uploads current state data to a LIC included in system monitoring program 122. In one scenario, data storage program 500 uploads normal state data. In another scenario, data storage program 500 uploads anomalous state data. In another scenario, data storage program uploads FEDC. In another embodiment, data storage program 500 uploads flagged state data (identified in step 502) that was stored to a logical partition (e.g., ROM disk).

Referring to decision step 516, responsive to determining that a network is not available (no branch, decision step 516), data storage program 500 flags the state data (step 520).

In step 520, data storage program 500 flags state data stored to a logical partition. In an embodiment, data storage program 500 includes adding a flag to state data stored in a logical partition to identify that the state data was not uploaded.

Figure 6:
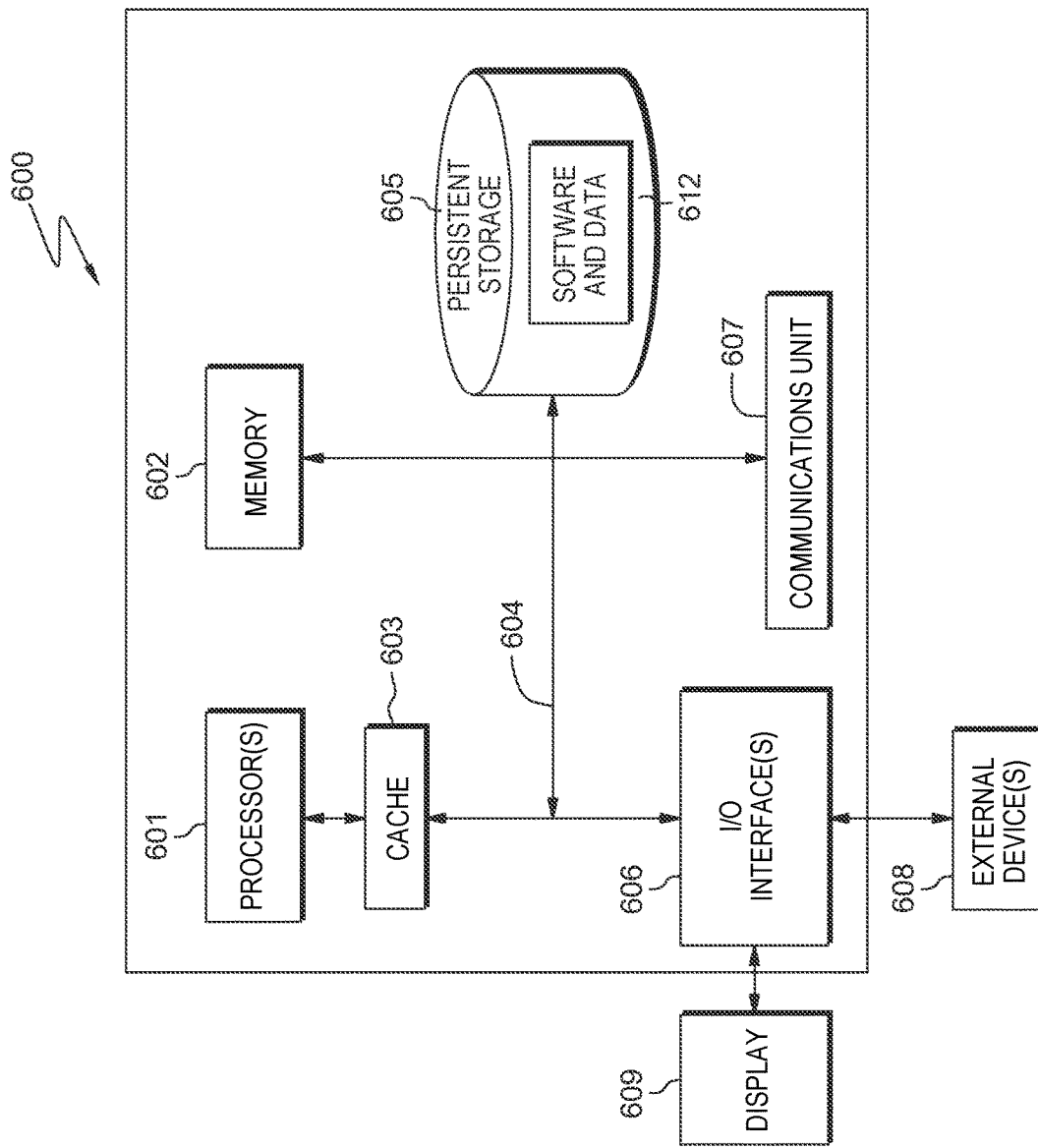
FIG. 6 is a block diagram of components of a computer, in accordance with an embodiment of the present invention.

FIG. 6 depicts computer system 600, which is representative of data storage 105, FRU 130, μC 134, device 120, and a service element (not shown). Computer system 600 is an example of a system that includes software and data 612. Computer system 600 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random-access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 612 are stored in persistent storage 605 for access and/or execution by one or more of the respective processor(s) 601 via cache 603 and one or more memories of memory 602. With respect to device 120, software and data 612 includes system monitoring program 122, one or more LICs (not shown), ROM disk program 400, and various programs (not shown). With respect to FRU 130 and μC 134, software and data 612 includes firmware 137, data storage program 500, and various programs (not shown).

Communications unit 607, in these examples, provides for communications with other data processing systems or devices, including resources of device 120. In these examples, communications unit 607 includes one or more network interface cards. Communications unit 607 may provide communications through the use of either or both physical and wireless communications links. Program instructions and data used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor. Display 609 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing data on a microcontroller, the method comprising:
    determining, by one or more computer processors, that a microcontroller of a field-replaceable unit (FRU) includes two or less logical partitions within non-volatile memory;
    determining, by one or more computer processors, a size of non-volatile memory included within the microcontroller;
    identifying, by one or more computer processors, another version of firmware that supports three or more logical partitions within non-volatile memory of the microcontroller based on the size of the non-volatile memory included within the microcontroller;
    determining, by one or more computer processors, that the identified other version of the firmware dictates that:
        (i) a first logical partition stores firmware for the microcontroller;
        (ii) a second logical partition stores data associated with a failure of the FRU; and
        (iii) a third logical partition stores vital product data related to operations of the FRU; and
    installing, by one or more computer processors, the identified other version of firmware within the non-volatile memory of the microcontroller of the FRU, wherein installing the identified other version of the firmware further includes storing vital product data related to the operations of the FRU to the third logical partition.

2. The method of claim 1, wherein the identified other version of the firmware further dictates storing information related to the operations of the FRU among one or more logical partitions and includes information selected from the group consisting of: state data associated with operating the FRU, one or more virtual LAN tables, and information related to one or more analyses performed by an execution of the identified other version of the firmware during the operation of the FRU.

3. The method of claim 1, wherein the vital product data related to the operations of the FRU includes information selected from the group consisting of: a part number, a serial number, an engineering change level, a firmware version number, runtime hours, calibration data, and one or more state data parameters utilized by the identified other version of the firmware.

4. The method of claim 1, wherein installing a version of firmware within the non-volatile memory of the microcontroller further comprises:
    erasing, by one or more computer processors, the non-volatile memory within the microcontroller utilizing a flash update control program, wherein erasing the non-volatile memory within the microcontroller includes deleting a current version of the firmware and removing each logical partition included within the non-volatile memory of the microcontroller;

downloading, by one or more computer processors, the identified other version of the firmware;

allocating, by one or more computer processors, the three or more logical partitions within the non-volatile storage of the microcontroller based on information associated with the identified other version of the firmware; and writing, by one or more computer processors, the identified other version of the firmware to the first logical partition utilizing the flash update control program.

5. The method of claim 4, further comprising:

downloading, by one or more computer processors, the vital product data related to the operations of the FRU; and writing, by one or more computer processors, the downloaded the vital product data related to the operations of the FRU to the third logical partition utilizing the flash update control program.

6. A computer program product for managing data on a microcontroller, the computer program product comprising:
one or more computer readable storage media and program instructions stored on the one or more computer readable storage media, the program instructions readable/executable by one or more computer processors:
program instructions to determine that a microcontroller of a field-replaceable unit (FRU) includes two or less logical partitions within non-volatile memory;
program instructions to determine a size of non-volatile memory included within the microcontroller;
program instructions to identify another version of firmware that supports three or more logical partitions within non-volatile memory of the microcontroller based on the size of the non-volatile memory included within the microcontroller;
program instructions to determine that the identified other version of the firmware dictates that:
(i) a first logical partition stores firmware for the microcontroller;
(ii) a second logical partition stores data associated with a failure of the FRU; and
(iii) a third logical partition stores vital product data related to operations of the FRU; and
program instructions to install the identified other version of firmware within the non-volatile memory of the microcontroller of the FRU, wherein program instruction to install the identified other version of the firmware further includes program instructions to store vital product data related to the operations of the FRU to the third logical partition.

7. The computer program product of claim 6, wherein the identified other version of the firmware further dictates storing information related to the operations of the FRU among one or more logical partitions and includes information selected from the group consisting of: state data associated with operating the FRU, one or more virtual LAN tables, and information related to one or more analyses performed by an execution of the identified other version of the firmware during the operation of the FRU.

8. The computer program product of claim 7, wherein the vital product data related to the operations of the FRU includes information selected from the group consisting of: a part number, a serial number, an engineering change level, a firmware version number, runtime hours, calibration data, and one or more state data parameters utilized by the identified other version of the firmware.

9. The computer program product of claim 6, wherein program instructions to install a version of firmware within the non-volatile memory of the microcontroller further comprise:
program instructions to erase the non-volatile memory within the microcontroller utilizing a flash update control program, wherein erasing the non-volatile memory within the microcontroller includes deleting a current version of the firmware and removing each logical partition included within the non-volatile memory of the microcontroller;
program instructions to download the identified other version of the firmware;
program instructions to allocate the three or more logical partitions within the non-volatile storage of the microcontroller based on information associated with the identified other version of the firmware; and
program instructions to write the identified other version of the firmware to the first logical partition utilizing the flash update control program.

10. The computer program product of claim 9, further comprising:
program instructions to download the vital product data related to the operations of the FRU; and
program instructions to write the downloaded the vital product data related to the operations of the FRU to the third logical partition utilizing the flash update control program.

11. A computer system for managing data on a microcontroller, the computer system comprising:
one or more computer processors;
one or more computer readable storage media;
program instructions stored on the computer readable storage media for execution by at least one of the one or more computer processors, the program instructions comprising:
program instructions to determine that a microcontroller of a field-replaceable unit (FRU) includes two or less logical partitions within non-volatile memory;
program instructions to determine a size of non-volatile memory included within the microcontroller;
program instructions to identify another version of firmware that supports three or more logical partitions within non-volatile memory of the microcontroller based on the size of the non-volatile memory included within the microcontroller;
program instructions to determine that the identified other version of the firmware dictates that:
(i) a first logical partition stores firmware for the microcontroller;
(ii) a second logical partition stores data associated with a failure of the FRU; and
(iii) a third logical partition stores vital product data related to operations of the FRU; and
program instructions to install the identified other version of firmware within the non-volatile memory of the microcontroller of the FRU, wherein program instruction to install the identified other version of the firmware further includes program instructions to store vital product data related to the operations of the FRU to the third logical partition.

12. The computer system of claim 11, wherein the identified other version of the firmware further dictates storing information related to the operations of the FRU among one or more logical partitions and includes information selected from the group consisting of: state data associated with operating the FRU, one or more virtual LAN tables, and information related to one or more analyses performed by an execution of the identified other version of the firmware during the operation of the FRU.

13. The computer system of claim 11, wherein program instructions to install a version of firmware within the non-volatile memory of the microcontroller further comprise:
   program instructions to erase the non-volatile memory within the microcontroller utilizing a flash update control program, wherein erasing the non-volatile memory within the microcontroller includes deleting a current version of the firmware and removing each logical partition included within the non-volatile memory of the microcontroller;
   program instructions to download the identified other version of the firmware;
   program instructions to allocate the three or more logical partitions within the non-volatile storage of the microcontroller based on information associated with the identified other version of the firmware; and
   program instructions to write the identified other version of the firmware to the first logical partition utilizing the flash update control program.

14. The computer system of claim 13, further comprising:
   program instructions to download the vital product data related to the operations of the FRU; and
   program instructions to write the downloaded the vital product data related to the operations of the FRU to the third logical partition utilizing the flash update control program.

15. The computer system of claim 11, wherein the vital product data related to the operations of the FRU includes information selected from the group consisting of: a part number, a serial number, an engineering change level, a firmware version number, runtime hours, calibration data, and one or more state data parameters utilized by the identified other version of the firmware.

16. The computer system of claim 11, wherein the FRU utilizes a logical partition of the microcontroller to store the vital product data related to the operations of the FRU as opposed to a serial electrically EPROM (SEEPROM) included within the FRU.

17. The computer system of claim 11, wherein utilizing the logical partition of the microcontroller to store the vital product data related to the operations of the FRU eliminates a requirement that the FRU includes a SEEPROM.

18. The computer system of claim 11, wherein one or more virtual LAN tables are stored within a logical partition of the microcontroller of the FRU as opposed to the FRU obtaining the one or more virtual LAN tables from a SEEPROM included within the FRU or downloading the one or more virtual LAN tables via a network connection operatively connected to the computer system.

\* \* \* \* \*